(12) United States Patent
Kalageros et al.

(10) Patent No.: US 7,052,077 B1
(45) Date of Patent: May 30, 2006

(54) CRUMPLE ZONE FOR BODY PANELS

(75) Inventors: Nick Kalageros, Coventry (GB); Holly Giangrande, Troy, MI (US); Roch Tolinski, Howell, MI (US); Charlie Hopson, Lebanon, TN (US); Steven Foster, Rochester Hills, MI (US); Laurent Arquevaux, Sully sur Loire (FR); Rainer Grimm, Frankfurt (DE); Carmelo Mondello, Frankfurt (DE)

(73) Assignee: Meritor Light Vehicle Systems, Inc., Troy, MI (US)

( * ) Notice: Subject to any disclaimer, the term of this patent is extended or adjusted under 35 U.S.C. 154(b) by 918 days.

(21) Appl. No.: 09/592,751

(22) Filed: Jun. 13, 2000

(51) Int. Cl.
*B60R 13/04* (2006.01)

(52) U.S. Cl. .................................... 296/191

(58) Field of Classification Search ................ 296/189, 296/191; 52/309.4, 309.8
See application file for complete search history.

(56) References Cited

U.S. PATENT DOCUMENTS

| | | | |
|---|---|---|---|
| 4,291,851 A | * | 9/1981 | Johnson |
| 4,598,008 A | * | 7/1986 | Vogt et al. |
| 4,950,522 A | * | 8/1990 | Vogt et al. |
| 5,040,646 A | * | 8/1991 | Drefahl |
| 5,165,627 A | * | 11/1992 | Amano et al. |
| 5,267,772 A | * | 12/1993 | Ohta et al. |
| 5,271,658 A | * | 12/1993 | Haldenwanger et al. |
| 5,451,377 A | * | 9/1995 | Asher et al. |
| 5,707,697 A | * | 1/1998 | Spain et al. |
| 5,829,215 A | * | 11/1998 | Billing |
| 5,853,195 A | * | 12/1998 | Le et al. |

* cited by examiner

*Primary Examiner*—Lori L. Coletta
(74) *Attorney, Agent, or Firm*—Carlson, Gaskey & Olds

(57) ABSTRACT

The body panels of the present invention are designed to crumple in a predisposed manner upon impact. The body panels are preferably made from a polymeric material. Further, the body panels can include a sheet of colored material attached to the polymeric material so that no painting of the panel is necessary. Preferably, the colored material is on an exterior surface of the panel. The colored material could be made from a thermoplastic with molded in color. The preferred embodiment of the present invention includes a polymeric material reinforced with spaced reinforcing fibers. An alternative embodiment of the body panel includes a sheet of polymeric material that is reinforced with spaced mechanical ribs that are preferably molded into the sheet of material. Another alternative embodiment of the body panel includes alternating sections of high density polymeric foam and low density polymeric foam. Yet another alternative embodiment of the body panel includes a sheet of foam material, preferably polymeric, that is reinforced with spaced metal inserts. The metal inserts are preferably notched to yield in a predetermined manner.

13 Claims, 3 Drawing Sheets

CRUMPLE ZONE FOR BODY PANELS

BACKGROUND OF THE INVENTION

This invention relates to vehicle body panels that crumple in a predisposed manner when impacted.

Body panels are used on vehicles to define the structure of the vehicle and create the design lines of the vehicle. Vehicle body panels also offer, to some extent, protection for the machinery under the hood and the occupants inside.

Currently, vehicle body panels are typically made from metallic panels. There are several disadvantages to using these known metallic panels. One disadvantage is that metallic panels can be harmful to pedestrians if there is a collision between a pedestrian and a vehicle. Another disadvantage of metallic panels is that they require painting. Further, metallic panels are expensive to manufacture.

Therefore, there is a need for a vehicle body panel that is less expensive to manufacture, does not require painting, and that is structurally sound yet crumples in a predetermined fashion to reduce the risk to a pedestrian in the case of an accident.

SUMMARY OF THE INVENTION

The vehicle body panel of the present invention overcomes the above problems of standard vehicle body panels made from sheet metal. In general terms, this invention discloses a vehicle body panel that will crumple in a predisposed manner upon impact. The panel includes a sheet of pre-painted or paintless material and preferably polymeric material that is reinforced at spaced locations.

There are various embodiments for reinforcing the sheet of material. Preferably, the sheet of polymeric material is reinforced with reinforcing fibers that are arranged in a predetermined manner. For instance, the reinforcing fibers could be arranged in spaced rows. In an alternative embodiment, the sheet of material is reinforced with spaced mechanical ribs. In another alternative embodiment, the sheet is reinforced with alternating sections of a rigid material and a less rigid material. For instance, the rigid material might be a high density polymeric foam and the less rigid material might be a low density polymeric foam. In yet another alternative embodiment, the sheet is reinforced with spaced metal inserts. Preferably, the metal inserts are directly molded into the component.

All of the embodiments described above can also include a sheet of colored material. The sheet of colored material is preferably a paintless film or alternatively pre-painted aluminum. The paintless film is preferably a thermoplastic material with molded-in color. If the sheet of colored material is used, the panel will not need to be painted.

There are several advantages to using these body panels in vehicles. These body panels are advantageous because they crumple in a predisposed manner and are, therefore, less harmful to pedestrians if there is a collision between the vehicle and a pedestrian. It is less expensive to produce body panels as described above compared to the cost to produce metallic body panels. Another advantage of the reinforced body panels is low weight compared to metallic body panels.

These and other features of the invention may be best understood from the following specification and drawings. The following is a brief description of the drawings.

DETAILED DESCRIPTION OF THE PREFERRED EMBODIMENT

Figure 1:
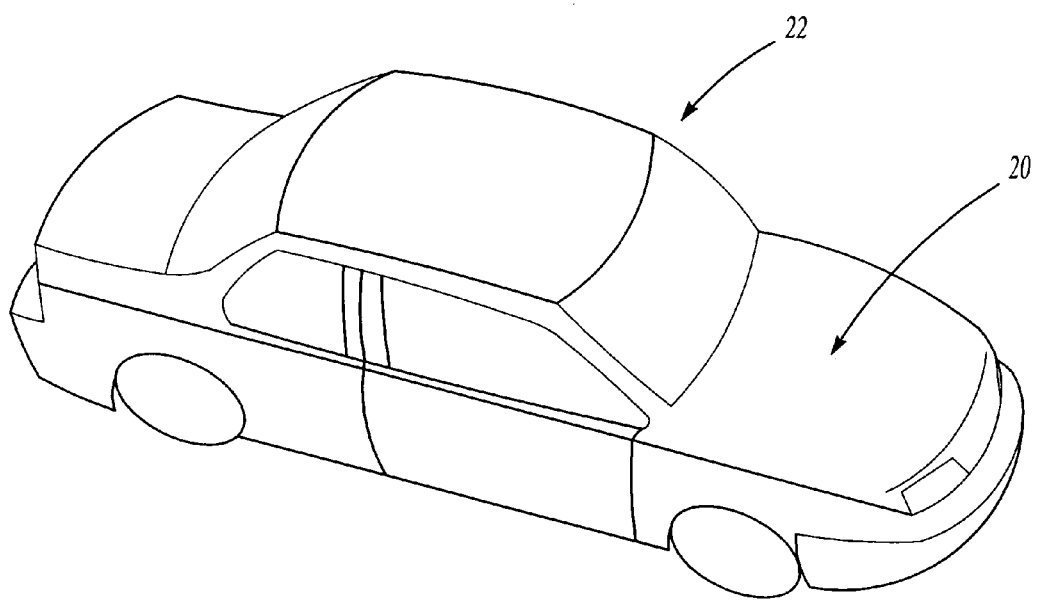
FIG. 1 is a perspective view of the device of the present invention installed on a vehicle.

FIG. 1 illustrates a vehicle body panel, shown generally at 20, attached to a vehicle 22. The panel 20 is shown used as the hood of the vehicle in FIG. 1, but is not just limited to this position. For instance, body panels of the present invention can also be used as front panels on the sides of a vehicle. Indeed, the inventive panels can be used in any exterior vehicle panel location.

Figure 2:
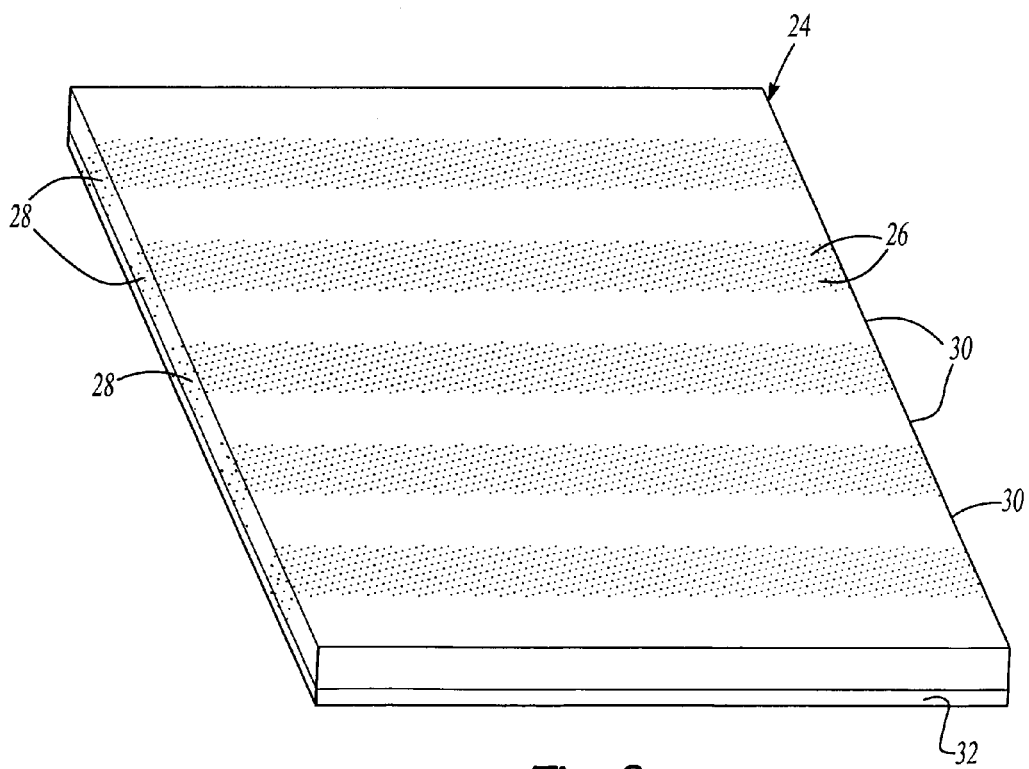
FIG. 2 is a perspective view of the preferred embodiment.

The preferred embodiment, as shown in FIG. 2, includes a sheet of polymeric material 24 that is reinforced with spaced reinforcing fibers 26. Preferably, the reinforcing fibers 26 are arranged in a predetermined pattern. For example, the reinforcing fibers could be positioned in spaced rows. Another way of describing the panel is that the panel includes predetermined areas with high concentrations 28 of reinforcing fibers 26 and areas with low concentrations 30 or no reinforcing fibers 26. The concentration areas 28, 30 in the panel are strategically located to allow the panel 24 to crumple in a predetermined manner upon impact. Alternatively, the orientation of the reinforcing fibers can be positioned in an alternating fashion so that the panel will crumple in a predetermined manner when impacted.

Further, the panel 24 may additionally include a sheet of colored material 32 attached to the sheet of reinforced polymeric material 24. Preferably, the sheet of colored material 32 is molded to the reinforced polymeric material 24. No painting of the component is required when the sheet of colored material 32 is used. The sheet of colored material 32 is preferably a paintless film or alternatively pre-painted aluminum.

Figure 3A:
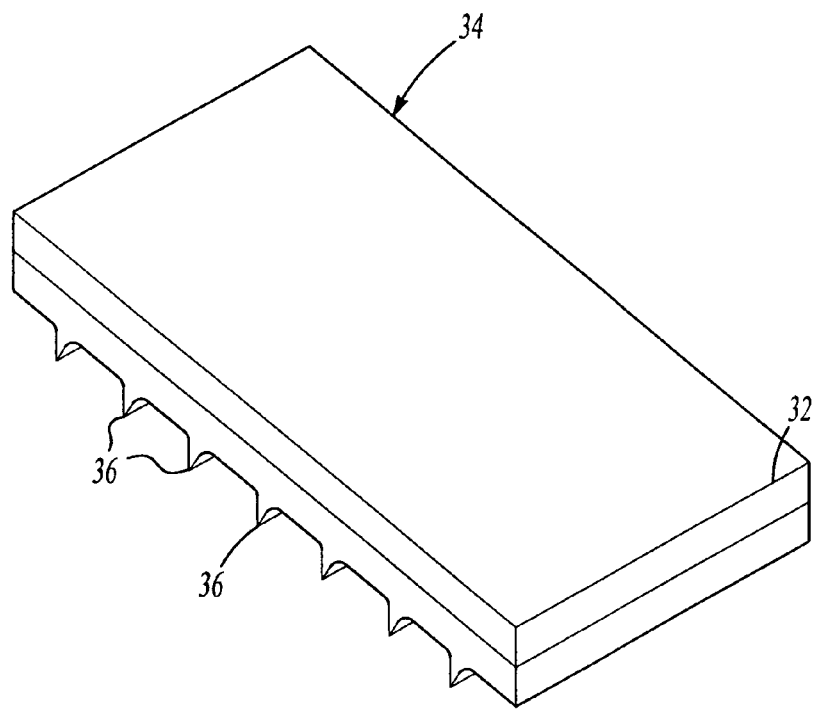
FIG. 3A is a perspective view of an alternative embodiment showing the side of the vehicle body panel facing the exterior of the vehicle.
Figure 3B:
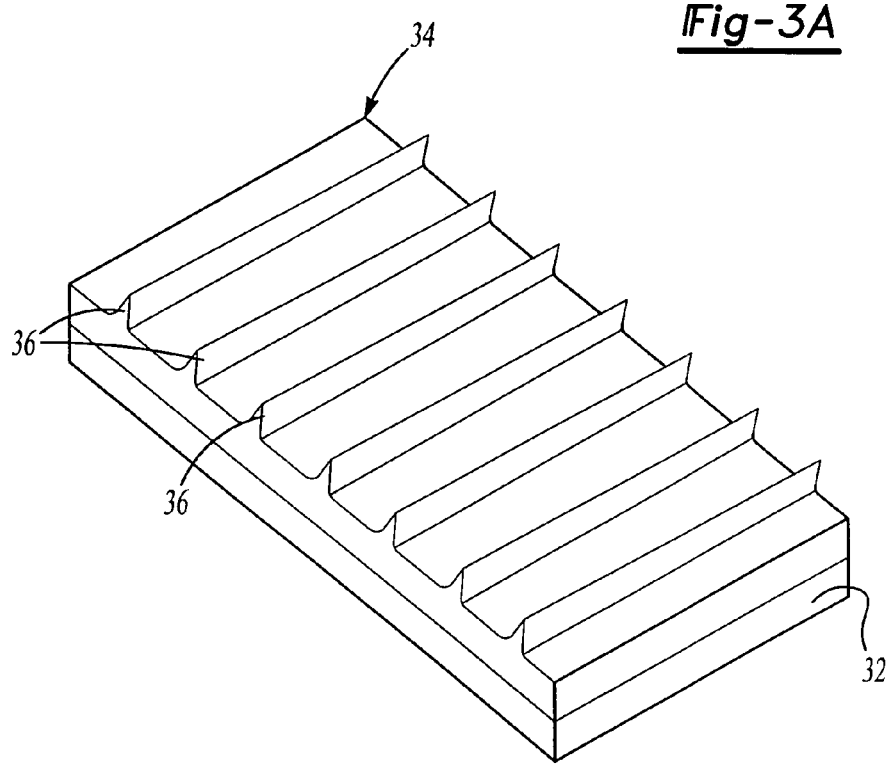
FIG. 3B is a perspective view of an alternative embodiment showing the side of the vehicle body panel not facing the exterior of the vehicle.

An alternative embodiment of the vehicle body panel, shown in FIGS. 3A and 3B, includes polymeric material 34 that is reinforced with spaced mechanical ribs 36. The mechanical ribs 36 are preferably molded into the polymeric material 34 during the molding process. Preferably, the polymeric material 34 is a sheet. The ribs 36 face inward when the panel is mounted on a vehicle. Further, the mechanical ribs are positioned so that the panel 34 will crumple in a predetermined manner when impacted. A sheet of colored material 32 may also be attached to the polymeric material 34 that is reinforced with mechanical ribs 36. Preferably, the sheet of colored material 32 is molded to the polymeric material 34.

Figure 4:
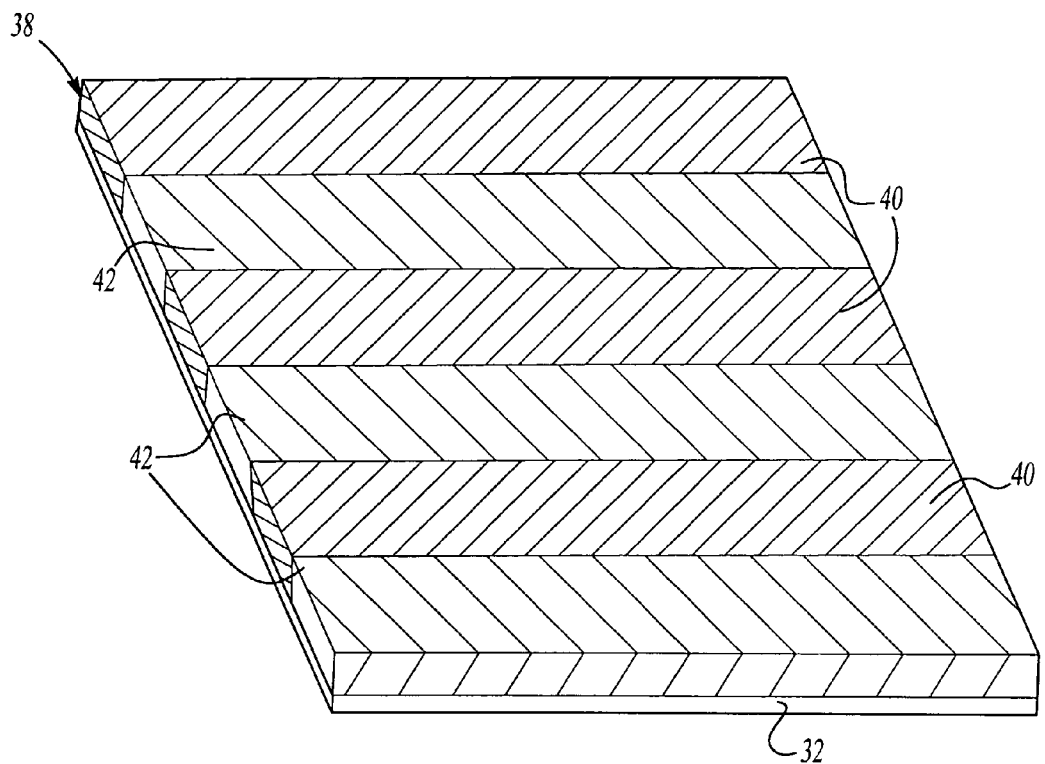
FIG. 4 is a perspective view of an alternative embodiment showing the side of the vehicle body panel not facing the exterior of the vehicle.

Another alternative embodiment of the vehicle body panel 38 is shown in FIG. 4. This embodiment of the panel 38 includes alternating sections of a rigid material 40 and a less rigid material 42. The less rigid material 42 is less rigid relative to the rigid material 40. Preferably, the rigid material 40 is made from a high density polymeric foam and the less rigid material 42 is made from a low density polymeric foam. The sections of foam 40, 42 are preferably arranged in rows. The sections 40, 42 are arranged so that the body panel 38 will crumple in a predetermined manner when impacted. For instance, if the body panel is impacted, the sections of low density polymeric foam 42 will yield before the sections of high density polymeric foam 40. Further, a sheet of colored material 32 can be attached to the alternating layers of high and low density foam 40, 42 so that the panel 38 does not need to be painted. The sheet of colored material 32 is preferably molded to the alternating layers of high and low density polymeric foam 40, 42. Again, material 32 faces outwardly when mounted on a vehicle.

Figure 5:
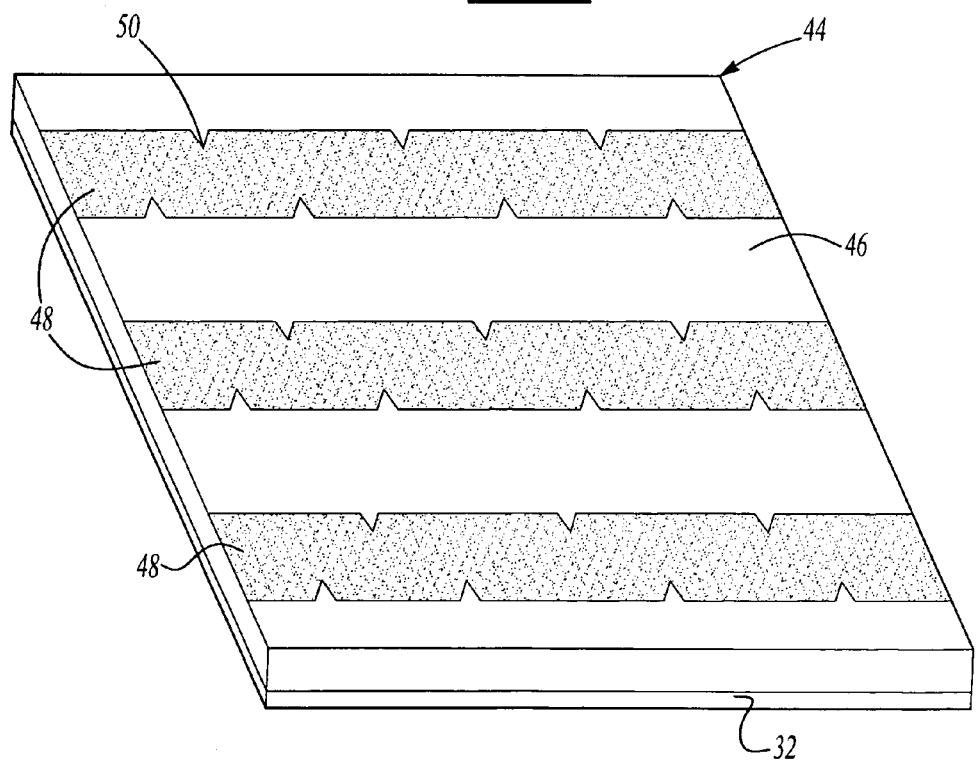
FIG. 5 is a perspective view of an alternative embodiment showing the side of the vehicle body panel not facing the exterior of the vehicle.

Yet another alternative embodiment of the vehicle body panel 44 is shown in FIG. 5. The vehicle body panel 44 is made from a polymeric material 46 that is reinforced with spaced metal inserts 48. Preferably, the polymeric material 46 is a polymeric foam. The metal inserts 48 are preferably notched 50 so that they will deform in a predetermined manner under impact. The metal inserts 48 are preferably molded into the polymeric foam material 46. A sheet of colored material 32 can also be attached to the polymeric foam material 46 that is periodically reinforced with metal inserts 48 so that the body panel 44 does not need to be painted.

Alternatively, any of the four embodiments can be combined to form a vehicle body panel 20.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A vehicle body panel comprising:
   a sheet of material reinforced with spaced reinforcing fibers;
   a sheet of colored material attached to said sheet of material; and
   spaced reinforcement on said sheet of material such that said panel crumples in a predetermined manner.

2. The body panel of claim 1 wherein said sheet of material is made from a polymer.

3. The body panel of claim 1 wherein said sheet of colored material is a paintless film.

4. The body panel of claim 1 wherein said sheet of colored material is a pro-painted aluminum.

5. A vehicle body panel comprising:
   a polymeric material reinforced with a spaced reinforcing material on one side wherein said spaced reinforcing material comprises reinforcing fibers; and
   a colored material attached to an opposed side of said polymeric material wherein said colored material defines an exterior surface of a vehicle body panel and said polymeric material with said spaced reinforcing material is deformable in a predetermined manner in response to an impact force.

6. The body panel of claim 5 wherein said colored material and said polymeric material are molded together to form the vehicle body panel and wherein said reinforcing fibers are orientated into said spaced reinforcing material in laterally spaced rows across the vehicle body panel.

7. A vehicle body panel comprising:
   a colored layer forming an exterior surface of a vehicle body panel; and
   a reinforcement layer attached to said colored layer such that said colored layer and said reinforcement layer are integrally molded together as one piece, said reinforcement layer including a plurality of first sections having a first deformability and a plurality of second sections having a second deformability that is less than said first defomability wherein said first and second sections alternate in a predetermined pattern laterally across the vehicle body panel such that said colored and reinforcement layers are deformable in a controlled manner in response to an impact force applied to the vehicle body panel, and wherein said reinforcement layer is comprised of a polymeric material with reinforcing fibers with said first sections having a high concentration of reinforcing fibers and said second sections having a low concentration of reinforcing fibers.

8. The body panel of claim 7 wherein said colored layer is comprised of a paintless polymer film and said reinforcement layer is comprised of a polymeric material.

9. The body panel of claim 7 wherein said first and second sections are alternating laterally spaced rows.

10. The body panel of claim 6 wherein said laterally spaced rows include a first plurality of rows having a first concentration of said reinforcing fibers in said polymeric material and a second plurality of rows having a second concentration of reinforcing fibers in said polymeric material that is less than said first concentration.

11. The body panel of claim 10 wherein said first and second plurality of rows alternate with each other in a linear direction across the vehicle body panel.

12. A vehicle body panel comprising:
    a colored layer forming an exterior surface of a vehicle body panel; and
    a reinforcement layer attached to said colored layer and including a plurality of first sections having a first deformability and a plurality of second sections having a second deformability that is less than said first deformability wherein said first and second sections alternate in a predetermined pattern laterally across the vehicle body panel such that said colored and reinforcement layers are deformable in a controlled manner in response to an impact force applied to the vehicle body panel, and wherein said reinforcement layer is comprised of a polymeric material and reinforcing fibers with said first sections having a high concentration of reinforcing fibers and said second sections having a low concentration of reinforcing fibers and wherein said first and second sections are interspaced with one another in a generally planar direction across the vehicle body panel.

13. The body panel of claim 12 wherein said first and second sections alternate with one another in regular intervals.

* * * * *